United States Patent [19]
Groves

[11] Patent Number: 6,157,000
[45] Date of Patent: Dec. 5, 2000

[54] REMOTE MOTOR CONTROLLED CONTACTOR RHEOSTAT

[76] Inventor: Richard P. Groves, 1220 Lisa La., Schererville, Ind. 46375

[21] Appl. No.: 09/225,755

[22] Filed: Jan. 5, 1999

Related U.S. Application Data

[60] Provisional application No. 60/070,398, Jan. 5, 1998.

[51] Int. Cl.[7] .................................................... B23K 9/10
[52] U.S. Cl. ............................................................ 219/132
[58] Field of Search .............................. 219/132, 130.1, 219/130.5, 137 PS

[56] References Cited

U.S. PATENT DOCUMENTS

| | | | |
|---|---|---|---|
| 2,438,634 | 3/1948 | Farrow | 219/132 |
| 2,443,776 | 6/1948 | Rimmington | 219/132 |
| 2,872,566 | 2/1959 | Leppala | 219/132 |
| 3,041,526 | 6/1962 | Rybolt | 219/132 |
| 3,402,341 | 9/1968 | Cook | 219/132 |
| 3,477,005 | 11/1969 | Weems | 219/132 |
| 3,581,051 | 5/1971 | Brown . | |
| 3,808,397 | 4/1974 | Wixson . | |
| 3,811,085 | 5/1974 | Saulsman | 219/132 |
| 4,119,830 | 10/1978 | Gilliland . | |
| 4,147,919 | 4/1979 | Matasovic . | |
| 4,467,174 | 8/1984 | Gilliland | 219/132 |
| 4,608,482 | 8/1986 | Cox et al. . | |
| 4,948,942 | 8/1990 | Hiibel . | |

FOREIGN PATENT DOCUMENTS

| | | |
|---|---|---|
| 25 07 822 A1 | 2/1976 | Germany . |
| 2 220 534 | 10/1990 | United Kingdom . |

*Primary Examiner*—Clifford C. Shaw
*Attorney, Agent, or Firm*—Wallenstein & Wagner. Ltd.

[57] ABSTRACT

A motor controlled rheostat assembly for a welding torch is disclosed. The assembly comprises a power source, a rheostat having a motor operatively connected thereto for controlling power to the welding torch, the rheostat being electrically connected to the power source and disposed remotely from the welding torch, a switch, connectable to the welding torch, having a first position and a second position, wherein when the switch is depressed toward the first position the motor rotates in a first direction to increase the power to the torch, and when the switch is depressed toward the second position the motor rotates in a second direction to decrease the power to the torch, and when pressure on the switch is released in either the first or second position the motor stops to maintain the power supplied to the torch at the desired level.

8 Claims, 2 Drawing Sheets

6,157,000

REMOTE MOTOR CONTROLLED CONTACTOR RHEOSTAT

RELATED APPLICATIONS

This application claims the benefit of U.S. Provisional Application No. 60/070,398, filed Jan. 5, 1998.

DESCRIPTION

1. Technical Field

The present invention relates generally to a remote motor controlled contactor rheostat for a welding torch.

2. Background of the Invention

When welding material such as aluminum, an operator of a welding torch must operate the welding torch at varying arc intensities while also maneuvering the torch through varying torch angles. It is desirable to provide a welding assembly that allows the operator to adjust the power to the torch without diverting the operator's attention from the welding operation in progress. It is also desirable to adjust the power to the torch without altering the angle of the torch.

Typically, rheostats used to adjust power in connection with welding apparatus are located remotely from the welding torch. Such rheostats generally include a mechanism for manually adjusting the power supplied to the welding torch. Adjusting the power may, therefore, cause the user to inadvertently alter the torch angle, resulting in an inferior weld.

SUMMARY OF THE INVENTION

It is an object of the present invention to provide a remote motor controlled contactor rheostat. Specifically, the remote motor controlled rheostat is designed to ease the process of controlling amperage to a water-cooled gas tungsten welding torch while welding alloys, especially aluminum.

In accordance with the invention, a motor controlled rheostat assembly for a welding torch is provided. The assembly includes power source and a rheostat which has a motor operatively connected thereto for controlling power to the welding torch. The rheostat is electrically connected to the power source and is disposed remotely from the welding torch. The assembly further includes a switch which is connectable to the welding torch. The switch has a first position and a second position. When the switch is depressed toward the first position, the motor rotates in a first direction to increase the power to the torch. Conversely, when the switch is depressed toward the second position the motor rotates in a second direction to decrease the power to the torch. When pressure on the switch is released in either the first or second position the motor stops to maintain the power supplied to the torch at a desired level.

Other advantages and aspects of the invention will become apparent upon making reference to the specification, claims, and drawings to follow.

DETAILED DESCRIPTION

Figure 1:
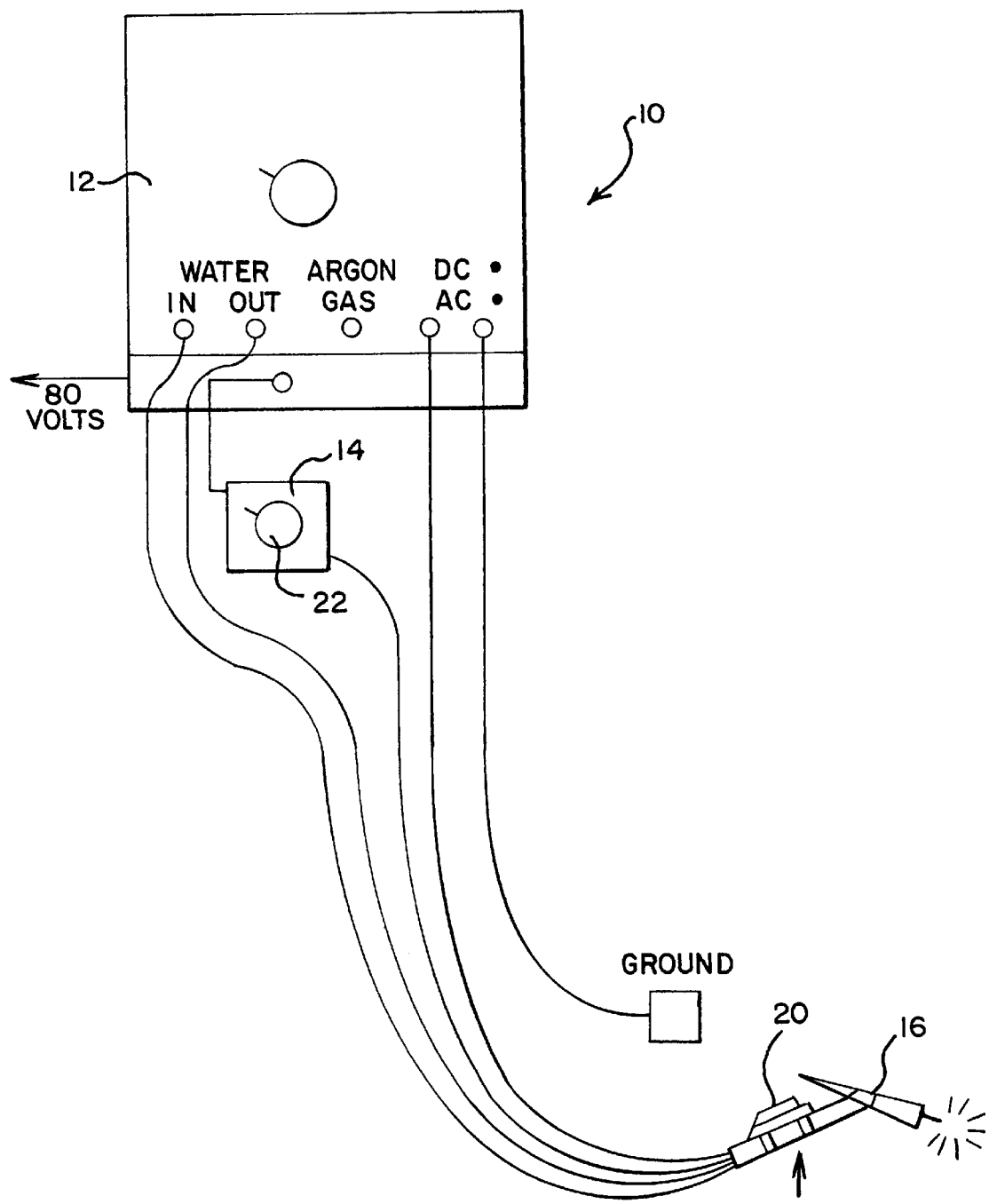
FIG. 1 is a diagram of an entire remote motor controlled contactor rheostat assembly according to the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

As illustrated in FIG. 1, the present invention provides a remote motor controlled contactor rheostat assembly 10 for a welding torch 16 that can increase and decrease the power output of power source 12. The assembly 10 includes the power source 12, a remote motor controlled rheostat 14, and a switch 20.

According to the present invention, the torch 16 is a commercially water-cooled gas tungsten welding torch suitable for welding aluminum and other materials. As may be seen in FIG. 1, the switch 20 is connectable to the torch 16. The switch may be connected by clips, straps or any other means suitable for securing the switch to a conventional welding torch.

Typically, the rheostat 14 is a commercially available rheostat such as a those sold by Miller Electric®. The rheostat 14 is electrically connected to the power source 12 and is disposed remotely from the welding torch 16. The rheostat 14 includes a knob 22 for manually adjusting the power output to the torch 16. Furthermore, the rheostat 14 includes a motor 18 operatively connected to the rheostat 14 that, as further described below, functions to remotely rotate the rheostat, thereby adjusting the power to the welding torch 16.

Figure 2:
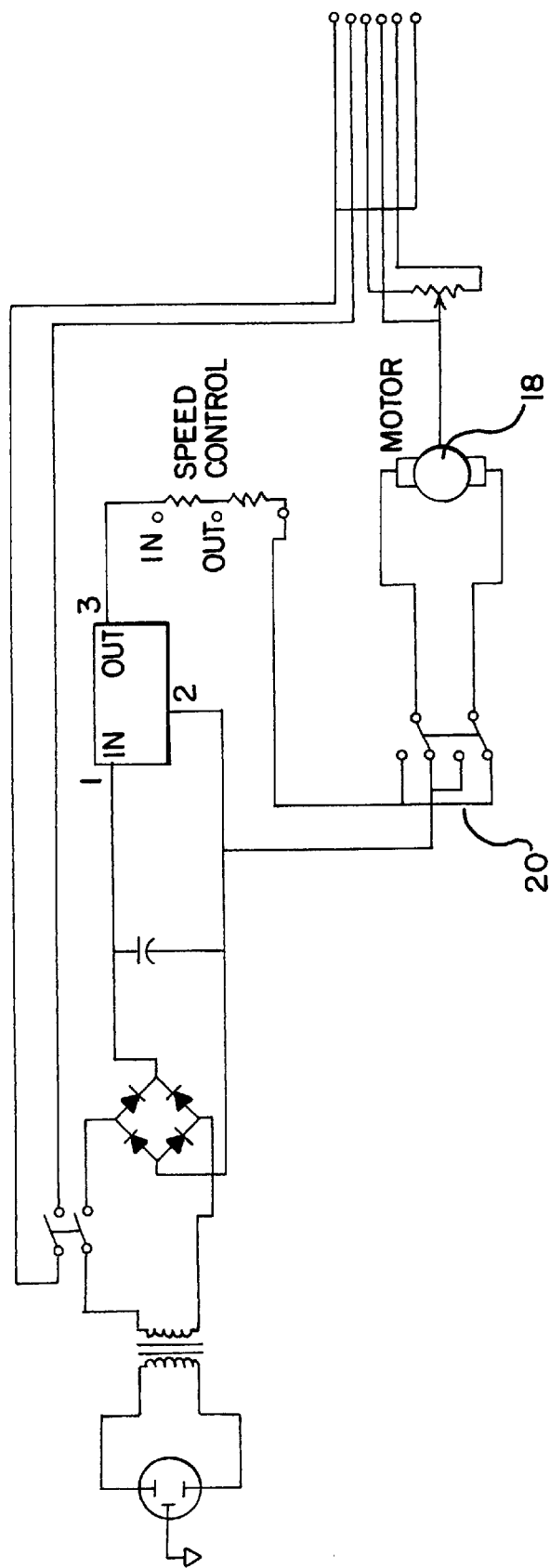
FIG. 2 is a schematic of an electronic control circuit employed by the assembly of FIG. 1.

Referring to FIG. 2, an electrical signal is sent from the switch 20 to the motor 18 of the remote rheostat 14 to control power to the welding torch 16. The electrical signal allows a user to turn the rheostat 14 "on," easily increase or decrease amperage while welding, and turn the rheostat 14 "off." Specifically, the switch 20 has a first position and a second position. When the switch 20 is depressed toward the first position the motor 18 rotates in a first direction to increase the power to the torch 16. Conversely, when the switch 20 is depressed toward the second position, the motor 18 rotates in a second direction to decrease the power to the torch 16. Finally, when pressure on the switch 20 is released in either the first or second position the motor 18 stops to maintain the power supplied to the torch 16 at the desired level. While the preferred embodiment shows a membrane switch 20, it is contemplated that the switch 20 be a rocker switch 20.

While a specific embodiment has been illustrated and described, numerous modifications come to mind without significantly departing from the spirit of the invention and the scope of protection is only limited by the scope of the accompanying claims.

I claim:

1. A motor controlled rheostat assembly for a welding torch comprising:

a power source for coupling to the welding torch;

a rheostat having a motor operatively connected thereto for controlling the power source, the rheostat being electrically connected to the power source and disposed remotely from the welding torch;

a rocker switch being connectable to the welding torch, having a first position and a second position, wherein when the rocker switch is depressed toward the first position the motor rotates in a first direction to increase the power to the torch, and when the rocker switch is depressed toward the second position the motor rotates in a second direction to decrease the power to the torch, and when pressure on the rocker switch is released in either the first or second position the motor stops to maintain the power supplied to the torch at the desired level.

2. The motor controlled rheostat assembly of claim 1 wherein the switch further includes a starting position, wherein the motor of the rheostat is started when the switch is initially depressed toward the first position.

3. The motor controlled rheostat assembly of claim 1 further including means for locally overriding the switch to control the power to the torch.

4. The motor controlled rheostat assembly of claim 1 wherein the switch further includes a starting position, wherein the motor of the rheostat is started when the switch is initially depressed toward the first position.

5. The motor controlled rheostat assembly of claim 4 further including means for locally overriding the switch to control the power to the torch.

6. A motor controlled rheostat assembly for a welding torch comprising:

a power source for coupling to the welding torch;

a rheostat having a motor operatively connected thereto for controlling the power source, the rheostat being electrically connected to the power source and disposed remotely from the welding torch; and, a rocker switch being connectable to the welding torch, having a starting position, a first position and a second position, wherein the motor of the rheostat is started when the rocker switch is initially depressed toward the first position, the motor rotates in a first direction to increase the power to the torch when the rocker switch is further depressed toward the first position, the motor rotates in a second direction to decrease the power to the torch when the rocker switch is depressed toward the second position, and when pressure on the rocker switch is released in either the first or second position the motor stops to maintain the power supplied to the torch at the desired level.

7. The motor controlled rheostat assembly for a welding torch of claim 6 further including means on the rheostat for locally overriding the switch to control the amperage to the torch.

8. A motor controlled rheostat assembly for a welding torch comprising:

a power source;

a rheostat having a motor operatively connected thereto for controlling power to a welding torch, the rheostat being electrically connected to the power source and disposed remotely from the welding torch;

a rocker switch being connectable to the welding torch, having a starting position, a first position and a second position, wherein the motor of the rheostat is started when the rocker switch is initially depressed toward the first position, the motor rotates in a first direction to increase the power to the torch when the rocker switch is further depressed toward the first position, the motor rotates in a second direction to decrease the power to the torch when the rocker switch is depressed toward the second position, and when pressure on the rocker switch is released in either the first or second position the motor stops to maintain the power supplied to the torch at the desired level; and, a means for attaching the rocker switch to the welding torch.

* * * * *